United States Patent
Reimnitz et al.

(10) Patent No.: US 12,401,249 B2
(45) Date of Patent: Aug. 26, 2025

(54) ELECTRIC MACHINE ARRANGEMENT

(71) Applicant: Schaeffler Technologies AG & Co. KG, Herzogenaurach (DE)

(72) Inventors: Dirk Reimnitz, Bühl (DE); Ivo Agner, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 271 days.

(21) Appl. No.: 18/019,319

(22) PCT Filed: Jul. 20, 2021

(86) PCT No.: PCT/DE2021/100628
§ 371 (c)(1),
(2) Date: Feb. 2, 2023

(87) PCT Pub. No.: WO2022/042789
PCT Pub. Date: Mar. 3, 2022

(65) Prior Publication Data
US 2023/0268792 A1  Aug. 24, 2023

(30) Foreign Application Priority Data
Aug. 26, 2020 (DE) .................... 10 2020 122 252.1

(51) Int. Cl.
*H02K 3/50* (2006.01)
(52) U.S. Cl.
CPC ........... *H02K 3/50* (2013.01); *H02K 2203/09* (2013.01)
(58) Field of Classification Search
CPC ........ H01J 2237/31769; H01J 37/3026; H02K 2203/09; H02K 3/50
See application file for complete search history.

(56) References Cited

U.S. PATENT DOCUMENTS

| | | | | |
|---|---|---|---|---|
| RE22,010 E | * | 1/1942 | Greiner | H02K 33/14 310/35 |
| 5,255,521 A | * | 10/1993 | Watanabe | F25B 9/14 60/520 |
| 2015/0229178 A1 | * | 8/2015 | Murakami | H02K 3/28 174/68.2 |

FOREIGN PATENT DOCUMENTS

| | | |
|---|---|---|
| DE | 1197971 B | 8/1965 |
| DE | 4424215 A1 | 1/1996 |
| DE | 102006052763 A1 | 5/2008 |
| DE | 102017205970 A1 | 10/2018 |
| DE | 102018209817 A1 | 12/2019 |
| JP | 2015109742 A * | 6/2015 |
| WO | 2011104763 A1 | 9/2011 |
| WO | 2011104764 A1 | 9/2011 |
| WO | WO-2019215776 A1 * | 11/2019 ............ H02K 11/33 |

OTHER PUBLICATIONS

WO-2019215776-A1, Hayashi et al., all pages (Year: 2019).*
JP-2015109742-A, Arai et al., all pages (Year: 2015).*

* cited by examiner

Primary Examiner — Naishadh N Desai
(74) Attorney, Agent, or Firm — Suiter Swantz IP

(57) ABSTRACT

An electric machine arrangement includes an electric machine having a stator and a rotor, wherein, at least one leaf spring element is arranged between a peripheral connection point of the stator and a component supporting the stator. The leaf spring element is formed as an electrical conductor in order to provide electrical contact with at least one of the winding connections of the stator.

17 Claims, 4 Drawing Sheets

ELECTRIC MACHINE ARRANGEMENT

CROSS-REFERENCE TO RELATED APPLICATIONS

This application is the U.S. National Phase of PCT Appln. No. PCT/DE2021/100628 filed Jul. 20, 2021, which claims priority to DE 102020122252.1 filed Aug. 26, 2020, the entire disclosures of which are incorporated by reference herein.

TECHNICAL FIELD

The present disclosure relates to an electric machine arrangement, comprising an electric machine for driving an electrically drivable motor vehicle, having a stator and a rotor, and an output element that is in contact with the rotor for conjoint rotation therewith.

BACKGROUND

For electric motors, it is important to align the parts through which the magnetic field flows very precisely, since even small deviations in the position of the parts among one another can have a significant effect on the magnetic flux (e.g., due to altered air gaps). It is therefore important to make the mechanical structure of the electric motor sufficiently robust to ensure the necessary exact alignment of the electric or magnetic parts. When designing the rotor and the stator, it is therefore important that these components are not deformed to an unacceptable degree either by forces generated by the motor itself or by external loads acting on the motor, or by inertial forces, such as the centrifugal force acting on the rotor. In addition, the bearing of the rotor must be sufficiently stiff to ensure the exact alignment of the rotor and stator.

In the practical design of electric motors for motor vehicles, the need to make the structure of the electric motor particularly stiff often conflicts with the requirements for compact design, low weight, high power density and low costs that always exist in vehicle construction.

SUMMARY

The object of the present disclosure is to provide an electric machine arrangement having an electric machine that ensures a design that is as space saving as possible. Advantageously, the electric machine arrangement should also be improved with regard to the electrical connections of the stator windings.

The object is achieved by an electric machine arrangement having the features described herein. An electric machine arrangement according to the disclosure comprises an electric machine for driving an electrically drivable motor vehicle, having a stator and a rotor, and an output element which is in contact with the rotor for conjoint rotation therewith. According to the disclosure, at least one leaf spring element is arranged between a peripheral connection point of the stator or of a stator housing and a component supporting the stator, wherein the leaf spring element is designed as an electrical conductor to provide the electrical contact to at least one of the winding connections of the stator. This achieves the advantage that the electrical connection of the ends of the stator winding is structurally simplified. While in known electric machines the ends of the stator windings in 3-phase machines first must be brought together peripherally at a central point, which is complex in terms of construction, to enable supplying with electricity there by means of a central supply connection, the ends of the stator windings according to the disclosure can essentially be connected locally there to power supply connections (the leaf spring elements that can be arranged to be distributed around the periphery) are connected where they come out or end peripherally at the end of the respective stator winding.

Further advantageous embodiments of the disclosure are described herein. The features listed individually in the claims can be combined with one another in technologically meaningful ways and can define further embodiments of the disclosure. In addition, the features indicated in the claims are specified and explained in more detail in the description, wherein further advantageous embodiments of the disclosure are shown.

First, the individual elements of the claimed subject matter of the disclosure are explained in the disclosure, and advantageous embodiments of the subject matter of the disclosure are described below.

Electric machines are used to convert electrical energy into mechanical energy and/or vice versa, and generally include a stationary part referred to as a stator, stand, or armature, and a part referred to as a rotor or runner, and arranged movably relative to the stationary part.

In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

The housing encloses the electric machine. A housing can also accommodate the control and power electronics. The housing can furthermore be part of a cooling system for the electric machine, and can be designed in such a way that cooling fluid can be supplied to the electric machine via the housing and/or the heat can be dissipated to the outside via the housing surfaces. In addition, the housing protects the electric machine and any electronics that may be present from external influences.

The stator of a radial flux machine is usually constructed cylindrically and generally consists of electrical laminations that are electrically insulated from one another and are constructed in layers and packaged to form laminated cores. With this structure, the eddy currents in the stator caused by the stator field are kept low. Distributed over the circumference, grooves or peripherally closed recesses are embedded into the electrical lamination running parallel to the rotor shaft, and accommodate the stator winding or parts of the stator winding. On the basis of the construction towards the surface, the slots can be closed with locking elements such as locking wedges or covers or the like to prevent the stator winding from being detached.

A rotor is the rotating (spinning) part of an electric machine. In particular, a rotor is used when there is also a stator. The rotor generally comprises a rotor shaft and one or more rotor bodies arranged on the rotor shaft for conjoint rotation. The rotor shaft can also be hollow, which on the one hand saves weight and on the other hand allows lubricant or coolant to be supplied to the rotor body. If the rotor shaft is hollow, components, for example shafts, from adjacent units can protrude into the rotor or through the rotor without negatively influencing the functioning of the electric machine.

The gap between the rotor and the stator is called the air gap. In a radial flux machine, this is an axially extending annular gap with a radial width that corresponds to the distance between the rotor body and the stator body. The magnetic flux in an electric axial flux machine, such as an electric drive machine of a motor vehicle designed as an axial flux machine, is directed axially in the air gap between the stator and rotor, parallel to the axis of rotation of the electric machine. The air gap that is formed in an axial flux machine is thus essentially in the form of a ring disk.

The magnetic flux in an electric axial flux machine, such as an electric drive machine of a motor vehicle designed as an axial flux machine, is directed axially in the air gap between the stator and rotor, parallel to the axis of rotation of the electric machine. With axial flux machines, a differentiation is made, among other things with a view to their expansion, between axial flux machines in an I-arrangement and axial flux machines in an H-arrangement. An axial flux machine in an I-arrangement is understood as meaning an electric machine in which a single rotor disk of the electric machine is arranged between two stator halves of a stator of the electric machine and can be acted upon by a rotating electromagnetic field. An axial flux machine in an H-arrangement is understood to be an electric machine in which two rotor disks of a rotor of the electric machine accommodate a stator of the electric machine in the annular space located axially therebetween, via which the two rotor disks can be subjected to a rotating electromagnetic field. The two rotor disks of an electric machine in an H-arrangement are mechanically connected to one another. This usually takes place via a shaft or a shaft-like connecting element, which protrudes radially inward (radially inside the magnets of the electric machine) through the stator and connects the two rotor disks to one another radially inward. A special form of the H-arrangement is represented by electric machines, the two rotor disks of which are connected to one another radially on the outside (radially outside of the magnets of the electric machine). The stator of this electric machine is then fastened radially on the inside (usually on one side) to a component that supports the electric machine. This special form of the H-arrangement is also known as the J-arrangement.

According to an advantageous embodiment of the disclosure, it can be provided that the at least one leaf spring element is designed as a leaf spring assembly, comprising a plurality of individual leaf springs. As a result, the electrical connection of the stator winding ends to a corresponding power supply can be further improved. In addition, an elasticity acting in the axial direction can be improved or adjusted in an improved manner due to the design as a leaf spring assembly.

According to a further advantageous embodiment of the disclosure, it can also be provided that the at least one leaf spring element is insulated at least in regions with respect to its outer surfaces by electrical insulating means. For this purpose, the electrical insulating means are advantageously designed as rubber bellows enveloping the leaf spring element. Such a rubber bellows can effectively ensure the insulation of the leaf spring element and at the same time prevent contamination of the connection points of the leaf spring element. At the same time, the assembly of the leaf spring elements is not adversely affected by such a bellows-like rubber bellows. Alternatively, it would also be conceivable to provide the insulation by means of insulating disks, which essentially simulate the shape of a single leaf spring and which also cover the leaf spring element or the leaf spring assembly laterally over an angled region in an insulating manner. A corresponding insulating disk would then be placed in a leaf spring assembly in front of the first individual leaf spring and after the last individual leaf spring.

Furthermore, according to a likewise advantageous embodiment of the disclosure, it can be provided that the at least one leaf spring element is connected to the stator on the stator side via a force-fitting and/or form-fitting connection, in particular by a screw or rivet connection. The means used to produce the force-fitting and/or form-fitting connection are designed to be electrically conductive to be able to ensure electrical contact beyond this connection point. The advantageous effect of this configuration is based on the fact that the leaf spring element can be securely fastened on the one hand, and on the other hand always ensures reliable electrical contact even if a small amount of mobility is permitted in the circumferential direction.

According to a further advantageous embodiment of the disclosure, it can be provided that the end of the at least one leaf spring element averted from the stator is electrically conductively connected to a fastening element for fastening via a force-fitting and/or form-fitting connection, in particular a screw or rivet connection the component supporting the stator, in particular to the housing of the electric machine. This also achieves the same advantages as those set out above for the other-end contact point of a leaf spring element.

Furthermore, the disclosure can also be further developed in such a way that the fastening element has a busbar section or a connection point for connection to a power supply supplying the electric machine. A secure connection and routing of the power connection point can be ensured in a simple manner in terms of production technology, in particular by a one-piece design of the fastening element and busbar section.

In a likewise advantageous embodiment of the disclosure, it can also be provided that the fastening element has electrical insulating means which are designed in such a way that electrical insulation is ensured between the leaf spring element and the component supporting the stator, and electrical insulating means are present between the leaf spring element and the fastening point. In particular, if the component supporting the stator were to be designed as a metal housing of the electric machine, such insulation would be necessary and would be solved in a structurally simple and cost-effective manner by integration into the fastening element.

It can also be advantageous to further develop the disclosure such that the electrical insulating means of the fastening element are formed such that the fastening element is made of plastic and has an electrically conductive metal insert for a fastening screw for the mechanical and electrical connection of the leaf spring element to an electrical supply line. This provides a very functionally reliable, cost-effective and space-saving solution for a corresponding insulation.

According to a further advantageous embodiment of the subject matter of the disclosure, it can be provided that three leaf spring elements arranged peripherally, in particular evenly distributed, are connected to the stator, thereby ensuring an optimized electrical connection of the stator winding ends for a 3-phase three-phase machine.

Finally, the disclosure can also be advantageously implemented in such a way that the at least one leaf spring element is designed as an axially elastic length compensation element, such that the at least one leaf spring element supports the stator in the direction of rotation and at the same time is connected to the component supporting the stator so that it can move axially in relation thereto. As a result, the leaf spring element can take on a dual function, on the one hand by taking over the electrical contacting of the stator windings or the power supply to the stator windings and by on the other hand movably supporting the electric machine in the axial direction, in a defined position.

The component supporting the stator is particularly preferably designed as a housing of the electric machine.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so explanations from other figures can additionally be used.

In the figures.

DETAILED DESCRIPTION

Figure 1:
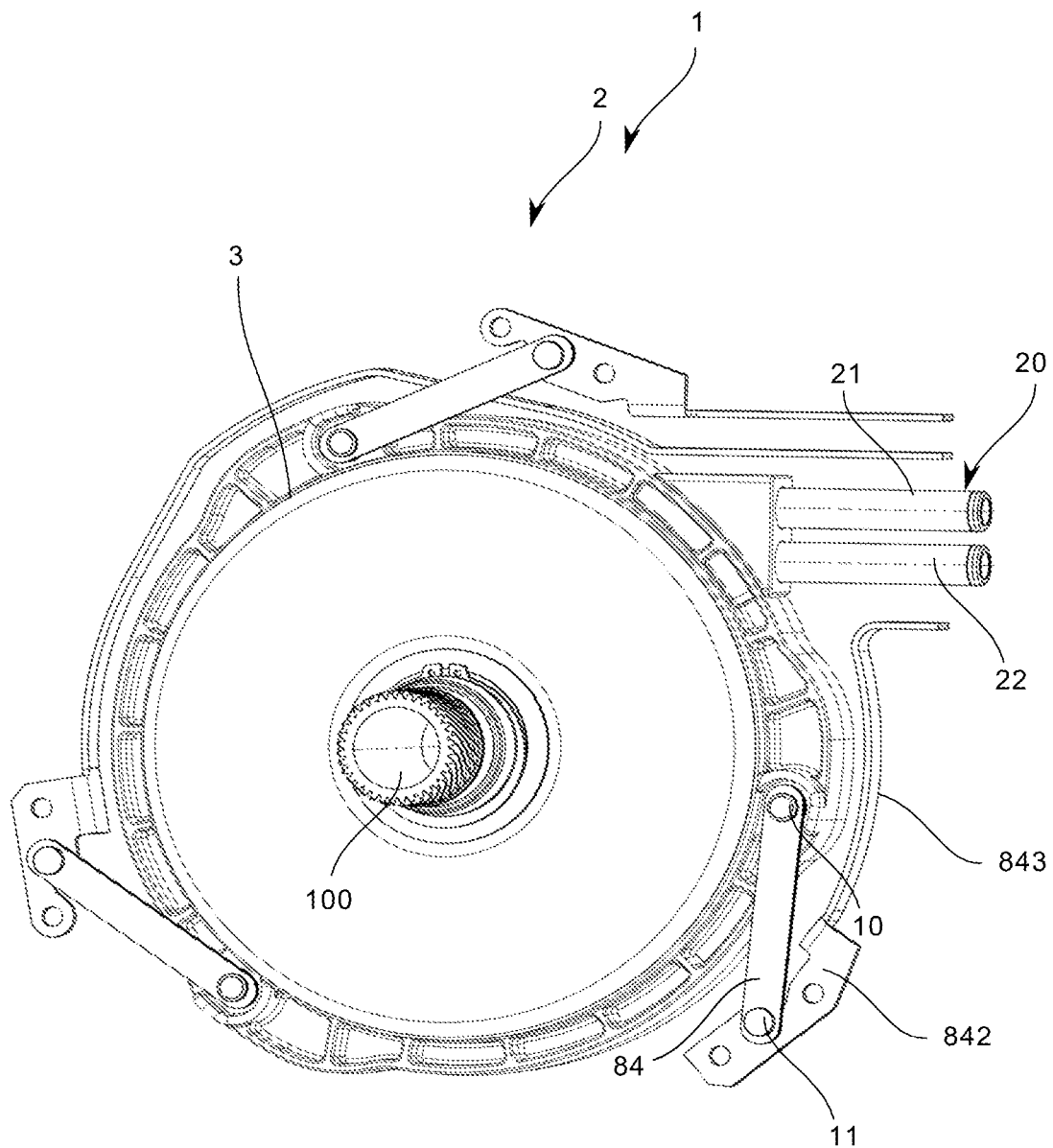
FIG. 1 shows a perspective representation of an electric axial flux machine in an I-arrangement having a torque support via leaf springs, a power supply via electric busbars and a coolant supply via movably mounted conduits.

FIG. 1 shows a perspective view of an electric machine 2 designed as an electric axial flux machine in an I-arrangement having a torque support via three leaf spring elements 84 distributed evenly around the periphery and connected to the stator 3, a power supply via leaf spring elements 84, and a coolant supply 20 via movably mounted conduits 21, 22. The electric machine assembly 1 shown comprises an electric machine 2 having a stator 3 and a rotor 4, wherein the stator 3 has three peripherally distributed leaf spring elements 84, each of which has a fastening element 842 at the end thereof averted from the stator 3 via which they can be fastened to a stationary component 6 supporting the stator 3. The rotor 4 cannot be seen in this view, since the rotor disk is arranged inside the stator 3 between two stator disks of the stator 3. The leaf spring elements 84 shown are designed as electrical conductors to ensure electrical contact with the winding connections inside the stator 3. An output shaft 100 protrudes centrally from the center of the stator 3 and is connected to the rotor 4 in a rotationally fixed manner inside the stator. In addition, two conduits 21, 22 of a coolant supply are shown in the upper right region of the illustration. The conduits 21, 22 are arranged on the stator 3 in such a way that, on the one hand, there is little mobility in the axial direction of the conduits 21, 22 and also in the axial direction of the output shaft 100. As can also be seen from FIG. 1, the leaf spring elements 84 are connected to the stator 3 on the stator side via a screw or rivet connection. At the end thereof averted from the stator 3, each of the leaf spring elements 84 is also electrically conductively connected to a fastening element 842 via a screw or rivet connection, wherein each of the leaf spring elements 84 can be fastened to the housing 7, not shown here, of the electric machine 2 by means of the fastening element 842 thereof. The fastening element 842 has a busbar section 843 for connection to a power supply (not shown here) that supplies the electric machine 2.

Figure 2:
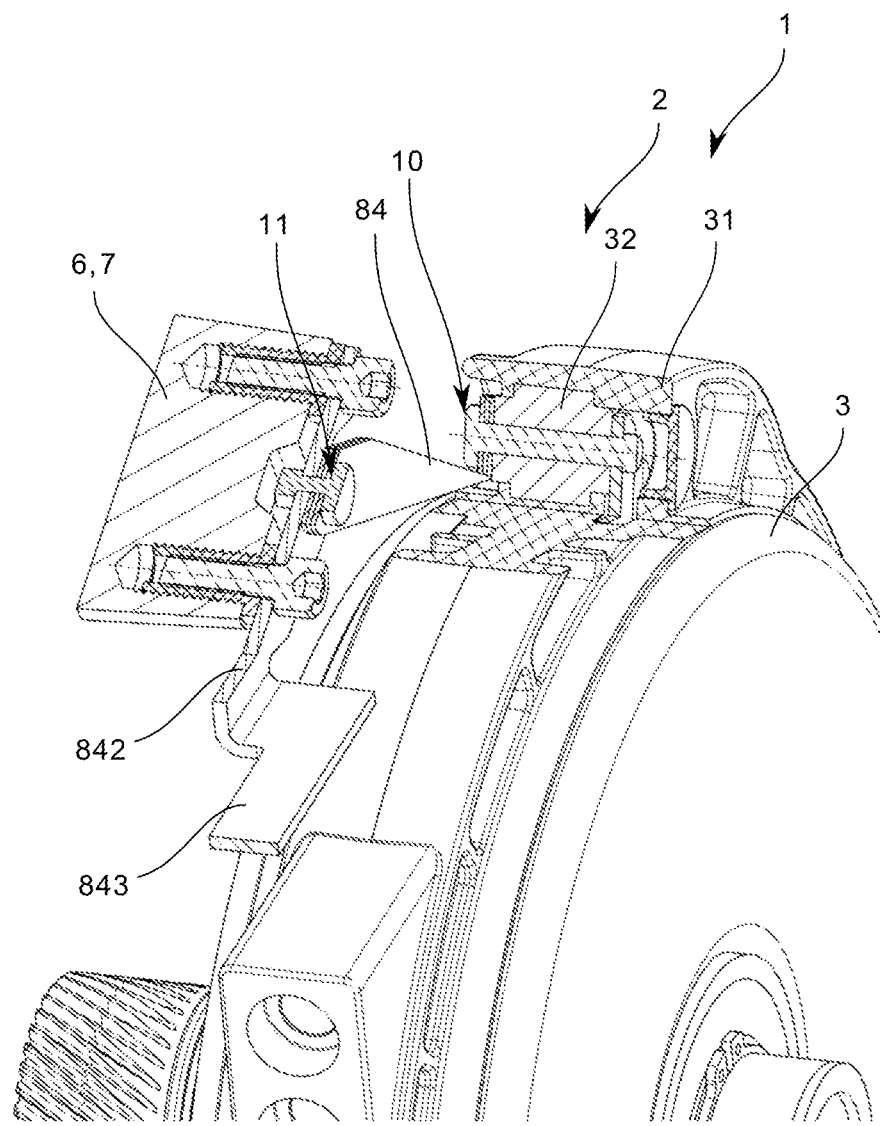
FIG. 2 shows a perspective partial view of the electric axial flux machine according to FIG. 1 with isolated partial sectional representations in the region of the stator-side and the housing-side connection of a leaf spring element.
Figure 3:
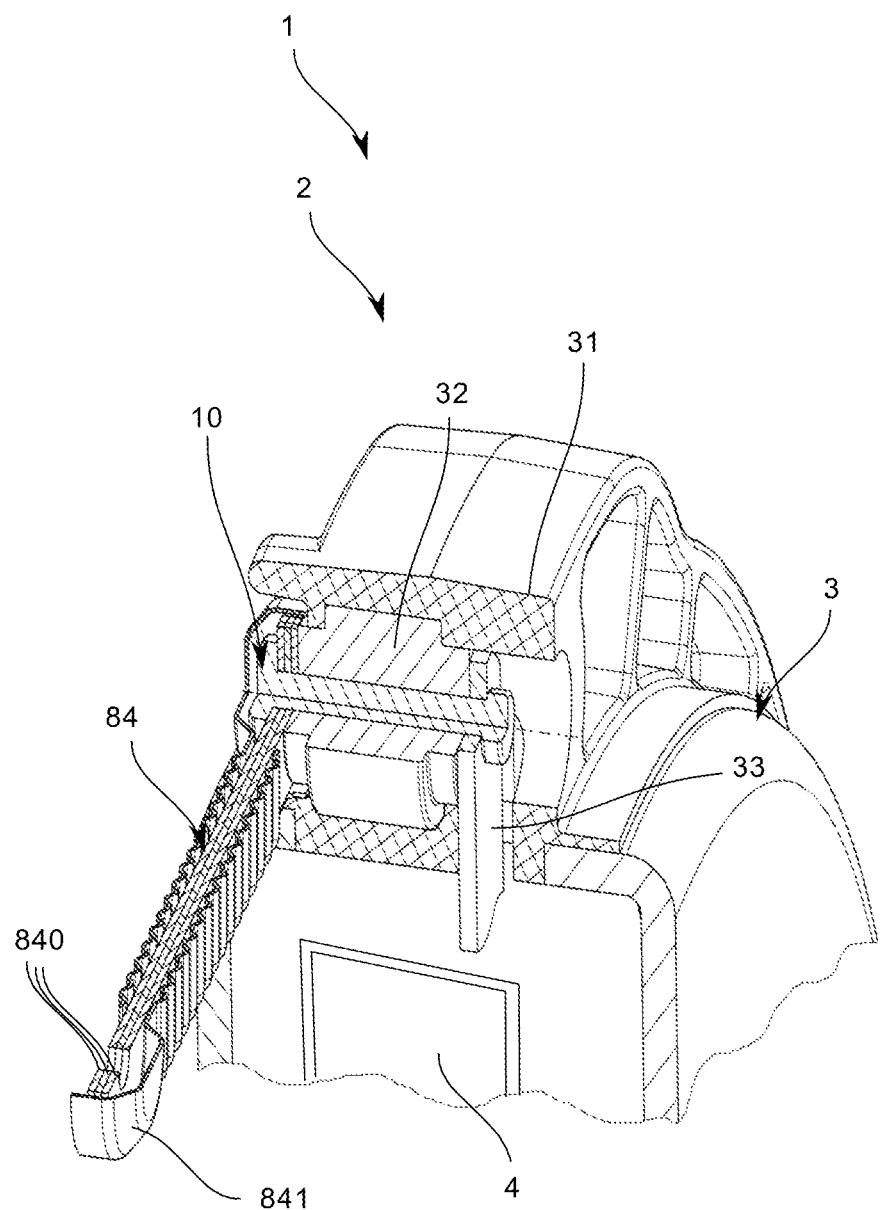
FIG. 3 shows a further perspective partial view of the electric axial flux machine according to FIG. 1 with isolated partial sectional representations in the region of the stator-side connection of a leaf spring element and in the region of the leaf spring element itself.

FIG. 2 shows the electric axial flux machine according to FIG. 1 in a perspective partial view with isolated partial sectional representations in the region of the stator-side and the housing-side connection of a leaf spring element 84. It is easy to see here that the leaf spring element 84 is connected to the stator 3 on the stator side by a riveted connection. The stator 3 has a mounting collar 31 made of plastic around the periphery, which in the region of the connection points for the leaf spring elements 84 has a mounting block 32 made of metal, for example, and provided with a through hole for the mounting rivet. FIG. 3 clearly shows how an electrical connection contact 33 for connecting the ends of the stator winding branches off from the fastening block 32 into the interior of the stator 3. In addition, FIG. 2 clearly shows how the leaf spring element 84 can be connected to the housing 7 of the electric machine 2 via the connected fastening element 842. The leaf spring element 84 is designed as a leaf spring assembly with a total of three individual leaf springs 840. On the housing side, the leaf spring assembly is connected via a further rivet connection to a fastening element 842, wherein the fastening element has a busbar section 843, which as can be seen well as in FIG. 1, can be peripherally guided as a sheet metal arch section to a central point for the supply connections. To ensure electrical insulation between the fastening element 842 and the metal housing 7, insulating inserts are embedded into the housing 7 and have an insulating collar at the screw insertion end to electrically separate the housing 7 from the fastening element in the form of an insulating washer.

FIG. 3 shows the electric axial flux machine according to FIG. 1 in a further perspective partial view with a partial sectional view in the region of the stator-side connection of a leaf spring element 84 and with a partial sectional view in the region of the leaf spring element 84 itself. Here it is indicated schematically how the rotor disk of the rotor 4 is arranged between two stator halves of the stator 3 in the sense of an I-arrangement. In addition, the structure of a leaf spring assembly made up of individual leaf springs 840 can be seen in this illustration, which is electrically insulated from the outside by means of an insulating element 841 designed as a bellows-like rubber bellows.

Figure 4:
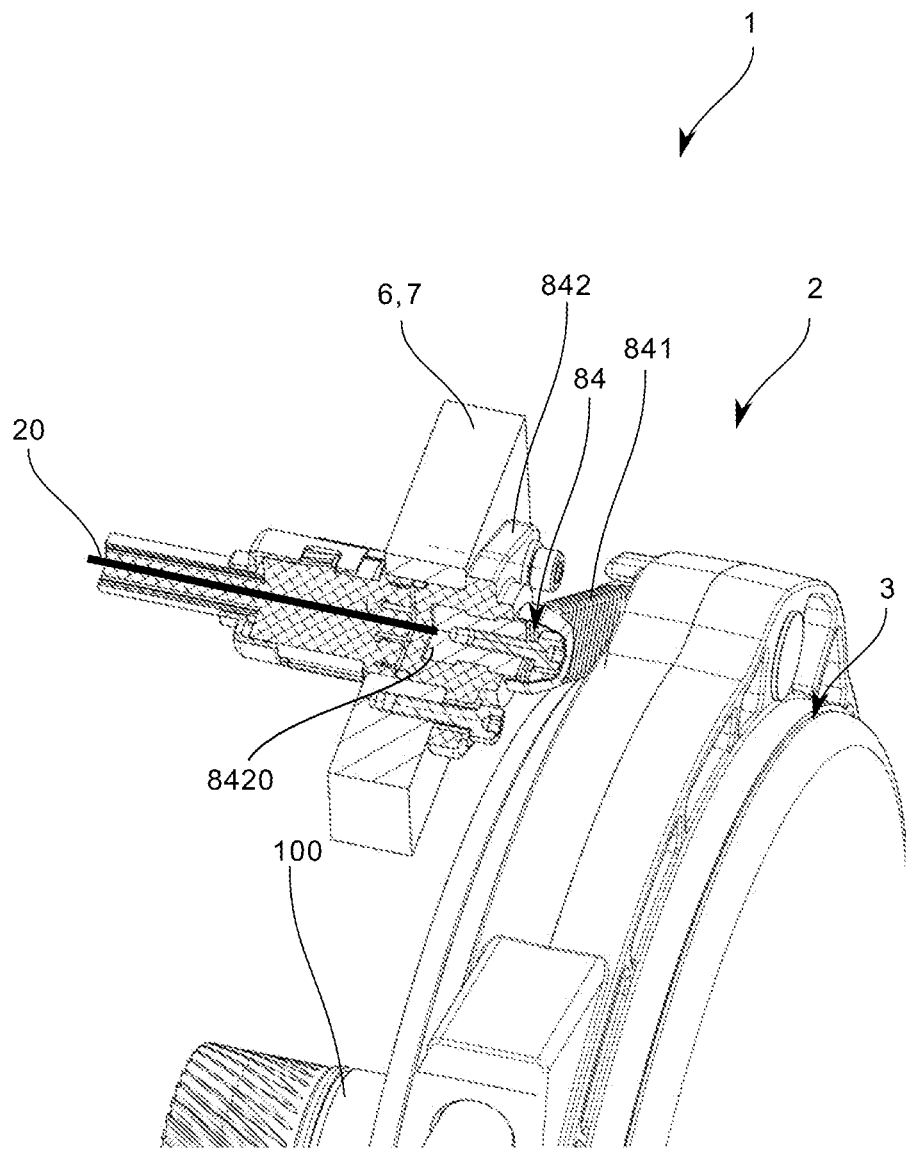
FIG. 4 shows a further perspective partial view of the electric axial flux machine according to FIG. 1 with a partial sectional representation in the region of the housing-side connection of a leaf spring element, in a schematic representation.

FIG. 4 shows the electric axial flux machine according to FIG. 1 in a further perspective partial view with a partial sectional representation in the region of the housing-side connection of a leaf spring element in a schematic representation. The fastening element 842 has an electrical insulating means which is designed in such a way that electrical insulation between the leaf spring element 84 and the component 6 supporting the stator 3 is ensured for the housing 7 of the electric machine 2. For this purpose, electrical insulating means is provided between the leaf spring element 84 and the fastening point 5, which means is formed in the illustrated embodiment in that the fastening element 842 itself is made of plastic. To nevertheless realize an electrically conductive connection between the leaf spring element 84 and the electrical connection means of a power supply, an electrically conductive metal insert 8420 for a fastening screw or a fastening rivet is provided inside the fastening element 842. The mechanical and electrical connection of the leaf spring element 84 to an electrical supply line 20 then takes place via these.

The electric machine 2 can be easily aligned with the construction described by screwing or riveting between the leaf spring element 84 and the fastening element 842 and by screwing or riveting between the fastening element 842 and the housing 7 of the electric machine 2.

The disclosure is not limited to the embodiments shown in the figures. The above description is therefore not to be regarded as limiting, but rather as explanatory. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Electric machine arrangement
2 Electric machine
3 Stator
31 Mounting ring
32 Mounting block
4 Rotor
6 Supporting component (supporting the stator)
7 Housing (electric machine)
84 Leaf spring element
840 Individual leaf springs
841 Electrical insulating means
842 Fastening element
843 Busbar section
8420 Metal insert
10 Connection (stator-side connection of the leaf spring element)
11 Connection (housing-side connection of the leaf spring element)
20 Coolant supply
21 Conduit (coolant)
22 Conduit (coolant)
30 Electrical supply line
100 Output shaft

The invention claimed is:

1. An electric machine arrangement, comprising:
an electric machine for driving an electrically drivable motor vehicle, having a stator with winding connections and having a rotor,
wherein:
at least one leaf spring element is arranged between a peripheral connection point of the stator and a component supporting the stator, wherein the leaf spring element is designed as an electrical conductor to provide electrical contact with at least one of the winding connections of the stator, the at least one leaf spring element is electrically conductively connected at an end facing away from the stator to a fastening element for fastening to the component supporting the stator, wherein the fastening element comprises an electrical insulating means configured to provide electrical insulation between the at least one leaf spring element and the component supporting the stator.

2. The electric machine arrangement according to claim 1, wherein:
the at least one leaf spring element is designed as a leaf spring assembly, comprising a plurality of individual leaf springs.

3. The electric machine arrangement according to claim 2, wherein:
the at least one leaf spring element is insulated at least in regions with respect to its outer surfaces by electrical insulating means.

4. The electric machine arrangement according to claim 1, wherein:
the at least one leaf spring element is connected to the stator on a stator side via a force-fitting or form-fitting connection.

5. The electric machine arrangement according to claim 1, wherein:
the at least one leaf spring element is electrically conductively connected at an end facing away from the stator via a force-fitting or form-fitting connection to a fastening element for fastening to the component supporting the stator.

6. The electric machine arrangement according to claim 5, wherein:
the fastening element has a busbar section or a connection point for connection to a power supply supplying the electric machine.

7. The electric machine arrangement according to claim 1, wherein:
the electrical insulating means of the fastening element are formed such that the fastening element is made of plastic and has an electrically conductive metal insert for a fastening screw for a mechanical and electrical connection of the leaf spring element to an electrical supply line.

8. The electric machine arrangement according to claim 1, wherein:
three leaf spring elements arranged peripherally, and evenly distributed, are connected to the stator.

9. The electric machine arrangement according to claim 1, wherein:
the at least one leaf spring element is designed as an axially elastic length compensation element, such that the at least one leaf spring element supports the stator in a direction of rotation and at the same time is connected to the component supporting the stator so that it can move axially in relation thereto.

10. The electric machine arrangement according to claim 1, wherein:
the component supporting the stator is designed as a housing of the electric machine.

11. The electric machine arrangement according to claim 1, wherein the at least one leaf spring element is connected to the stator on a stator side via a screw or rivet connection.

12. An electric machine arrangement, comprising:
an electric machine having a rotor and a stator with winding connections; and
at least one leaf spring element arranged between a peripheral connection point of the stator and a component supporting the stator, wherein the at least one leaf spring element is electrically conductively connected at an end facing away from the stator to a fastening element for fastening to the component supporting the stator, wherein the fastening element is made of plastic and includes an electrically conductive metal insert for a fastening screw for a mechanical and electrical connection of the leaf spring element to an electrical supply line.

13. The electric machine arrangement according to claim 12, wherein the leaf spring element is an electrical conductor configured to provide electrical contact with at least one of the winding connections of the stator.

14. The electric machine arrangement according to claim 13, wherein the at least one leaf spring element is insulated at least in regions with respect to its outer surfaces by rubber bellows enveloping the leaf spring element.

15. The electric machine arrangement according to claim 12, wherein the at least one leaf spring element is connected to the stator on a stator side via a screw or rivet connection.

16. The electric machine arrangement according to claim 12, wherein the fastening element has a busbar section or a connection point for connection to a power supply supplying the electric machine.

17. The electric machine arrangement according to claim 12, wherein the at least one leaf spring element supports the stator in a direction of rotation and at the same time is connected to the component supporting the stator so that it can move axially in relation thereto.

* * * * *